April 22, 1924.

M. O. SCHUR

VALVE

Filed Dec. 16, 1921

1,491,248

Inventor:
Milton O. Schur
by
Albright Brown Quinby & May
Attys.

Patented Apr. 22, 1924.

1,491,248

UNITED STATES PATENT OFFICE.

MILTON O. SCHUR, OF BERLIN, NEW HAMPSHIRE, ASSIGNOR TO BROWN COMPANY, OF BERLIN, NEW HAMPSHIRE, A CORPORATION OF MAINE.

VALVE.

Application filed December 16, 1921. Serial No. 522,866.

*To all whom it may concern:*

Be it known that I, MILTON O. SCHUR, a citizen of the United States, residing at Berlin, in the county of Coos and State of New Hampshire, have invented new and useful Improvements in Valves, of which the following is a specification.

This invention relates to valves having been designed more particularly for multiple passage plug valves. In fluid pressure systems it is often desirable to control the admission of fluid from a source of pressure to a pressure responsive mechanism, and when the supply of pressure is cut off from the mechanism to permit it to exhaust therefrom into a supply reservoir. Such a system is employed in a mechanism for testing the bursting strength of sheet material disclosed in my application for patent filed November 9, 1921, Serial Number 514,044.

This invention is particularly designed for use in such a system and provides against the loss of fluid from the system by leakage at the valve. Not only does this invention prevent loss of fluid from the system but it prevents leakage from escaping to the operator's table and soiling the work or his clothing. For this purpose the valve casing, having ports for connection to the supply mechanism and exhaust reservoir and a conical opening to which these ports lead for the reception of the controlling plug, has passageways leading from the exhaust port to opposite ends of the plug. Fluid which leaks past the plug may then find its way to the exhaust reservoir.

For a more complete understanding of this invention, together with further objects and advantageous details and combinations of parts, reference may be had to the accompanying drawings in which—

Figure 1:
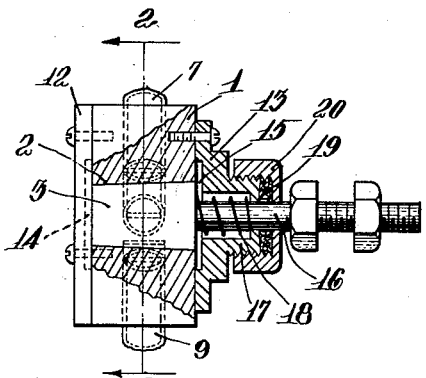
Figure 1 is a side elevation partly in section of the valve.
Figure 2:
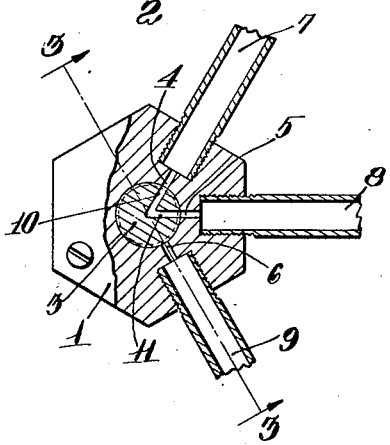
Figure 2 is a section on line 2—2 of Figure 1.

Referring to these drawings the valve casing comprises a block 1 having a frustroconical opening 2 centrally therethrough for the reception of a frustro-conical plug 3. The block 1 has passages or ports 4, 5, and 6 therein with which communicate pipes, 7, 8, and 9 which may lead, respectively, to a supply of fluid pressure, a fluid pressure mechanism and an exhaust reservoir. The plug 3 has ports 10 and 11 therein forming together a connecting passageway which may be brought into engagement selectively with the ports 4 and 5 or 5 and 6 by rotation of the plug 3. When the ports 10 and 11 are in communication with the ports 4 and 5 fluid pressure may pass from the supply to the pipe 7 to the mechanism to be actuated thereby, while when the plug is rotated to connect the ports 5 and 6 the pressure is cut off from the supply and the mechanism is exhausted to the fluid reservoir. As shown, the ports 4, 5, 6, 10, and 11 are restricted in size, this being for the purpose of restricting the flow of fluid in order to prevent sudden rushes through the valve due to sudden changes in pressure in the system. In many cases, however, this construction will not be found necessary or desirable, and it therefore forms no essential part of this invention.

As fluid is likely to leak past the plug 3 provision is made for conducting such leakage to the exhaust reservoir. This comprises a pair of cap plates 12 and 13 constructed to overlie the ends of the block 1, the cap plate 12 having a recess 14 on its inner face overlapping the smaller end of the plug 3, and cap plate 13 having a similar recess 15 overlapping the larger end of the plug. For the purpose of actuating this plug it is provided with a stem 16, which projects through the cap plate 13, this plate being formed with a recessed boss 17 within which, surrounding the stem 16, is seated a coil spring 18 by which the plug is urged axially into close seating engagement with the opening 2. A packing 19 through which the stem 16 passes may be positioned beyond the boss 17 and may be retained in position by a cap 20 threaded externally on the boss.

Figure 3:
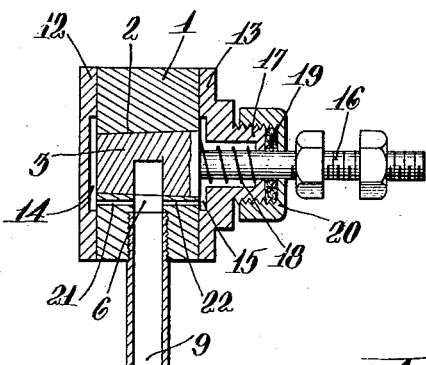
Figure 3 is a section on line 3—3 of Figure 2, the valve plug being turned to register one of its ports with the exhaust port of the casing.

Transversely through the block 1, as shown more particularly in Figure 3, are a pair of ports 21 and 22, leading outwardly from the exhaust port 6 and communicating at their outer ends with the recesses 14 and 15 of the cap plates. By this means any fluid leaking past the plug and escaping at either end may find its way through the recesses 14 and 15 and the ports 21 and 22 to the exhaust port 6. It is therefore evident that no fluid will be allowed to escape from the valve casing away from the fluid pressure system, consequently there is no loss of fluid occurring at the valve and there is no dripping from the valve. It will also be evident that the friction on the valve stem due to the packing is reduced to a minimum since the packing need be compressed only sufficiently to overcome the lowest fluid pressure in the system, (i. e., the pressure in the exhaust reservoir) rather than the highest as in the case of the common type of plug valve; and that since both ends of the valve plug communicate with the exhaust port, the fluid pressure on the ends of the plug is always practically balanced.

Having thus described an embodiment of this invention it should be evident to those skilled in the art that many changes and modifications might be made therein without departing from its spirit or scope as defined by the appended claims.

I claim:

1. A valve comprising a casing having a plurality of ports, means for selectively connecting said ports, and means for conducting leakage past said connecting means to one of said ports, certain of said ports being constricted to prevent rapid flow therethrough.

2. A valve comprising a casing having an opening for a plug and a plurality of ports leading to said opening and adapted to be connected respectively to a fluid pressure supply, a fluid pressure mechanism, and an exhaust, a plug in said opening having ports for selectively connecting said casing ports, and means for subjecting opposite ends of said plug to pressure from said exhaust port.

3. A valve comprising a casing having an opening for a plug and a plurality of ports leading to said opening and adapted to be connected respectively to a fluid pressure supply, a fluid pressure mechanism, and an exhaust, a plug in said opening having ports for selectively connecting said casing ports, a stem extending from one end of said plug by which it may be turned, a cap having an opening through which said stem passes for enclosing said end, a packing for said cap opening surrounding said stem, and a connection from said exhaust port to the inner side of said cap whereby the pressure tending to escape past said packing is of low value.

4. A valve comprising a casing having an opening for a plug and a plurality of ports leading to said opening and adapted to be connected respectively to a fluid pressure supply, a fluid pressure mechanism, and an exhaust, a plug in said opening having ports for selectively connecting said casing ports, and means for conducting leakage past the ends of said plug to said exhaust port.

5. A valve comprising a casing having an opening for a plug and a plurality of ports leading to said opening and adapted to be connected respectively to a fluid pressure supply, a fluid pressure mechanism, and an exhaust, a plug in said opening having ports for selectively connecting said casing ports, chambered caps enclosing the ends of said plug, and ports leading from said chambers beyond the ends of said cap to said exhaust port.

In testimony whereof I have affixed my signature.

MILTON O. SCHUR.